(12) United States Patent
Jackson et al.

(10) Patent No.: US 11,020,657 B1
(45) Date of Patent: Jun. 1, 2021

(54) SYSTEMS AND METHODS FOR IDENTIFICATION AND AUTOMATION OF GAMING COMPETITION REPORTING AND INTEGRITY

(71) Applicant: UGC Holdings LLC, Edwardsville, IL (US)

(72) Inventors: Matthew W. Jackson, DuQuoin, IL (US); Jeffrey S. Cooper, Edwardsville, IL (US)

(73) Assignee: UGC Holdings LLC, Edwardsville, IL (US)

( * ) Notice: Subject to any disclaimer, the term of this patent is extended or adjusted under 35 U.S.C. 154(b) by 0 days.

(21) Appl. No.: 16/698,694

(22) Filed: Nov. 27, 2019

(51) Int. Cl.
*A63F 13/20* (2014.01)
*A63F 13/30* (2014.01)
*A63F 13/77* (2014.01)
*A63F 13/40* (2014.01)
*A63F 13/71* (2014.01)
*A63F 13/79* (2014.01)

(52) U.S. Cl.
CPC .............. *A63F 13/30* (2014.09); *A63F 13/40* (2014.09); *A63F 13/71* (2014.09); *A63F 13/77* (2014.09); *A63F 13/79* (2014.09); *A63F 2300/407* (2013.01); *A63F 2300/552* (2013.01)

(58) Field of Classification Search
CPC ........ A63F 13/20; A63F 13/213; A63F 13/25; A63F 13/327; A63F 13/33; A63F 13/332; A63F 13/335; A63F 13/355; A63F 13/537; A63F 13/58; A63F 13/655; A63F 13/798; A63F 13/46; A63F 2300/1087; A63F 2300/203; A63F 2300/208; A63F 2300/5533; A63F 2300/554; A63F 2003/5546; A63F 2300/558; A63F 2300/61; A63F 2300/65; A63F 2230/695; G01N 2223/401; G06K 9/00114; G06K 2209/01; G06K 7/1404; G06T 2207/20081; G06T 2207/20101; H04N 1/00331

See application file for complete search history.

(56) References Cited

U.S. PATENT DOCUMENTS

| | | | |
|---|---|---|---|
| 10,402,689 B1* | 9/2019 | Bogdanovych | G06T 11/60 |
| 2010/0331078 A1* | 12/2010 | Thompson | A63F 13/35 463/29 |
| 2017/0157517 A1* | 6/2017 | Lindquist | A63F 13/69 |
| 2019/0168124 A1* | 6/2019 | Haile | A63F 13/803 |

* cited by examiner

*Primary Examiner* — Omkar A Deodhar
(74) *Attorney, Agent, or Firm* — Howard & Howard Attorneys PLLC

(57) ABSTRACT

A system comprises a database stored on a server and a processing device of the server. The processing device is in communication with a user device accessible to a user. The processing device includes a hosting unit, a communications unit, an image processing unit, and a validation unit. The hosting unit is configured to generate and display a web-based application on a user device. The communications unit is configured to enable the user to access and interact with the web-based application on the user device and receive at least one user-submitted image and a plurality of user-submitted data from the user. The image processing unit is configured to process the at least one user-submitted image to retrieve game data. The validation unit is configured to compare the plurality of user-submitted data with the game data and validate the game data.

17 Claims, 14 Drawing Sheets

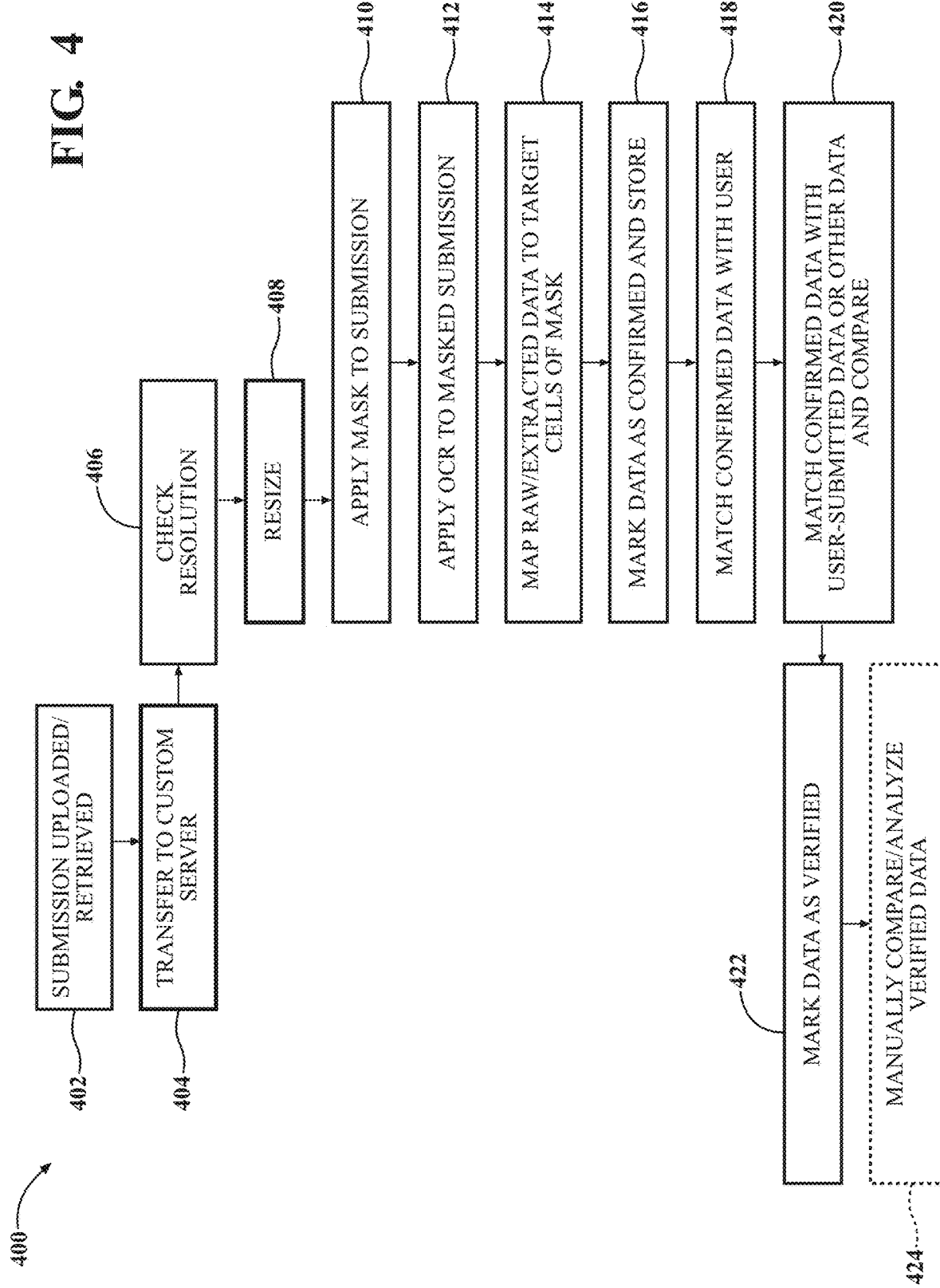

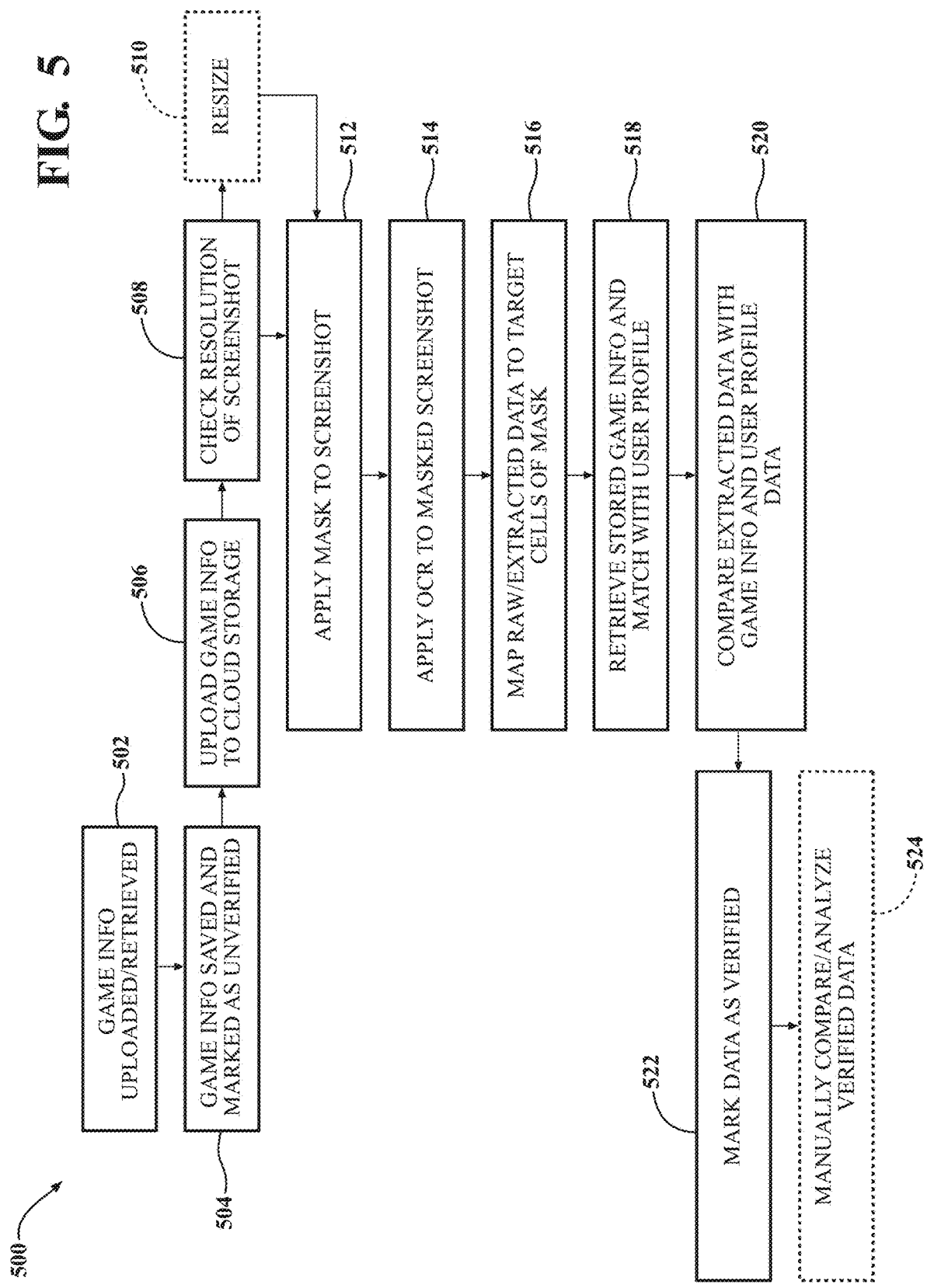

US 11,020,657 B1

SYSTEMS AND METHODS FOR IDENTIFICATION AND AUTOMATION OF GAMING COMPETITION REPORTING AND INTEGRITY

FIELD OF THE DISCLOSURE

The present disclosure relates generally to systems and methods for automating gaming competition reporting, and more specifically, to systems and methods for identifying and automating gaming competition reporting and integrity utilizing image masking and optical character recognition.

BACKGROUND

The advancement of recreational and competitive gaming has created a need for a higher level of speed and accuracy in submission and reporting of competition results. Current online and live gaming tournament, competition, and reporting systems are limited because they rely on manual operation and verification processes. Manual verification of user submissions is inconsistent, due to human error, and extremely time-consuming. These processes are insufficient to keep up with the growing volume of players, competitions, and gaming platforms.

The present disclosure is aimed at solving one or more of the problems identified above.

SUMMARY OF INVENTION

According to one embodiment of the present invention, a system comprises a database stored on a server and a processing device of the server. The processing device is in communication with a user device accessible to a user. The processing device includes a hosting unit, a communications unit, an image processing unit, and a validation unit. The hosting unit is configured to generate and display a web-based application on a user device. The communications unit is configured to enable the user to access and interact with the web-based application on the user device and receive at least one user-submitted image and a plurality of user-submitted data from the user. The image processing unit is configured to process the at least one user-submitted image to retrieve game data. The validation unit is configured to compare the plurality of user-submitted data with the game data and validate the game data.

According to another embodiment of the present invention, a computer-implemented method comprises generating and displaying, by a hosting unit, a web-based application on a user device accessible by a user. The method further comprises enabling, by a communication unit, the user to access and interact with the web-based application on the user device. The method further comprises receiving, by the communication unit, at least one user-submitted image and a plurality of user-submitted data from the user. The method further comprises processing, by an image processing unit, the at least one user-submitted image to retrieve game data. The method further comprises comparing, by a validation unit, the plurality of user-submitted data with the game data. The method further comprises validating, by the validation unit, the game data.

According to yet another embodiment of the present invention, a non-transitory information recording medium on which a computer readable program is recorded that causes a computer to function as a system comprises a database stored on a server and a processing device in communication with a user device accessible to a user. The processing device includes a hosting unit, a communications unit, an image processing unit, and a validation unit. The hosting unit is configured to generate and display a web-based application on a user device. The communications unit is configured to enable the user to access and interact with the web-based application on the user device and receive at least one user-submitted image and a plurality of user-submitted data from the user. The image processing unit is configured to process the at least one user-submitted image to retrieve game data. The validation unit is configured to compare the plurality of user-submitted data with the game data and validate the game data.

BRIEF DESCRIPTION OF THE DRAWINGS

Advantages of the present disclosure will be readily appreciated, as the same becomes better understood by reference to the following detailed description, when considered in connection with the accompanying drawings. Non-limiting and non-exhaustive embodiments of the present disclosure are described with reference to the following figures, wherein like numerals refer to like parts throughout the various views unless otherwise specified.

FIG. 4 is a flow diagram illustrating an algorithm for a gaming report validation method, according to one embodiment of the present invention;

FIG. 5 is a flow diagram illustrating an algorithm for a gaming report validation method applied to an exemplary competitive video gaming environment, according to one embodiment of the present invention;

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment of example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The present disclosure particularly describes systems and methods for identifying and automating gaming competition reporting and integrity utilizing image masking and optical character recognition.

The systems and methods provide an autonomous process that permits more users to participate within the online gaming environment. The system and methods also provide a higher level of security, consistency, and accuracy of reporting within the online gaming ecosystem by using optical character recognition and custom-built match validation processes. These systems and methods may be used in any gaming environment, on any gaming platform, and may provide additional opportunities for other non-traditional gaming competitions (e.g., non-video gaming) to enter the space, such as match betting and educational leagues.

The system allows users to submit gaming competition results by capturing images or videos (or any other suitable media) that contain match results. The system utilizes image masking (which may be created manually or by machine learning), combined with optical character recognition (OCR) to complete a validation process. Over time, the system's use of machine learning creates an automated process that eventually reduces or eliminates the need for manual review and/or validation by an operator.

Figure 1:
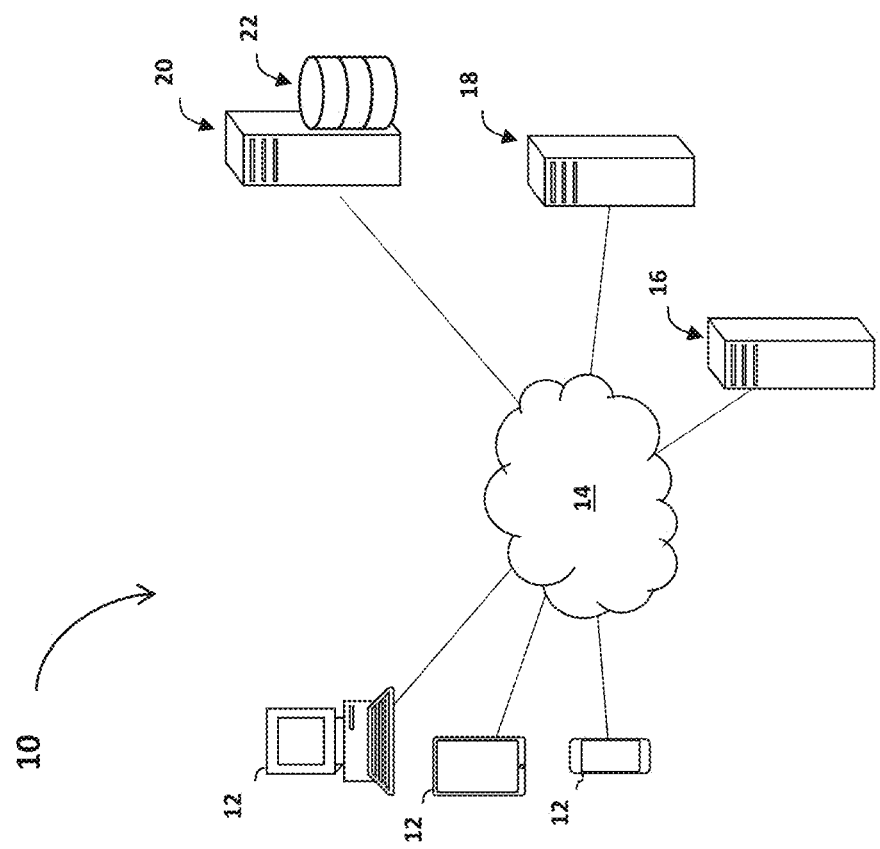
FIG. 1 a schematic illustrating various aspects of a gaming competition reporting and integrity system, according to the present invention.

With reference to the Figures and in operation, the present invention provides a system 10, as well as methods and computer product media to allow the identifying and automating of gaming competition reporting and integrity utilizing optical character recognition using the system 10. In general use, the system 10 includes a processing device that allows a user (e.g., a customer of a gaming competition automation service) to manage automation of gaming competition reporting via a website or an application, i.e., "app", running on a user device. Referring to FIG. 1, an exemplary environment in which the system 10 operates is illustrated. In the illustrated embodiment, the system 10 is configured to enable a user to access a website or application with one or more user computing devices 12.

For clarity in discussing the various functions of the system 10, multiple computers and/or servers are discussed as performing different functions. These different computers (or servers) may, however, be implemented in multiple different ways such as modules or units within a single computer, as nodes of a computer system, etc. . . . . The functions performed by the system 10 (or nodes or modules or units) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

In the illustrated embodiment, the system 10 includes a hosting server 16, a system server 18, a database server 20, a database 22, and one or more user computing (or customer) devices 12 that are each coupled in communication via a communications network 14. The communications network 14 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The user computing device 12 may include any suitable device that enables a user to access and communicate with the system 10 including sending and/or receiving information to and from the system 10 and displaying information received from the system 10 to a user. For example, in one embodiment, the user computing device 12 may include, but is not limited to, a desktop computer, a laptop or notebook computer, a tablet computer, smartphone/tablet computer hybrid, a personal data assistant, a handheld mobile device including a cellular telephone, and the like. The user computing device 12 may be used to by a user, such as a customer, to access the system 10.

The hosting server 16 may be configured to host a website or provide data to the app that is accessible by a user via one or more user computing devices 12. For example, the hosting server 16 may retrieve and store a web page associated with one or more websites in response to requests received by the user via the user computing device 12 to allow users to interact with the website or web-based application. In one embodiment, the hosting server 16 is configured to generate and display a web page associated with the website in response to requests being received via corresponding web browsers that are displayed on the user computing devices 12.

Figure 2:
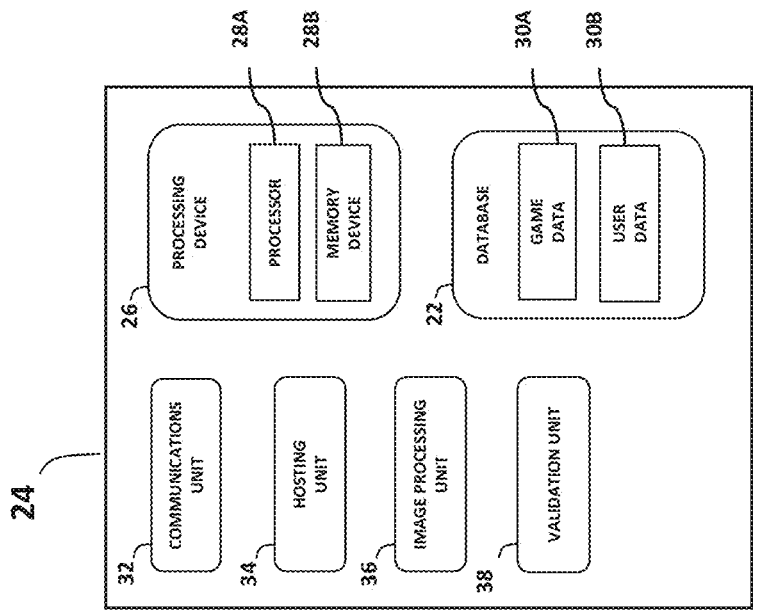
FIG. 2 is a schematic illustrating example components of a server, according to one embodiment of the present invention.

Referring to FIG. 2, in one embodiment, the system 10 may include a server 24 that is configured to perform the functions of the hosting server 16, the system server 18, and/or the database server 20. In the illustrated embodiment, the server 24 includes a processing device 26 and the database 22.

The processing device 26 executes various programs, and thereby controls components of the server 24 according to user instructions received from the user computing device 12. The processing device 26 may include a processor or processors 28A and a memory device 28B, e.g., read only memory (ROM) and random access memory (RAM), storing processor executable instructions and one or more processors that execute the processor-executable instructions. In embodiments where the processing device 26 includes two or more processors 28A, the processors 28A can operate in a parallel or distributed manner. In an example, the processing device 26 may execute and/or implement a communications unit 32, a hosting unit 34, an image processing unit 36, and a validation unit 38.

The database server 26 includes a memory device 28A that is connected to the database 22 to retrieve and store information contained in the database 22. The database 22 contains information on a variety of matters, such as, for example, game data 30A, user data 30B, and/or any suitable information that enables the system 10 to function as described herein. User data 30B may include profiles of individual users and may additionally include performance statistics or other metrics associated with the users. In one embodiment, users may be prompted to register with or create profiles within the system. A profile may include information about the user (e.g., contact information, biographical data, etc.) so that the user may be identified within the system and, for instance, may later be matched to game data corresponding with the user. In some embodiments, access to the system may be denied if a user does not create a profile.

The memory device 28B may be configured to store programs and information in the database 22, and retrieve information from the database 22 that is used by the processor to perform various functions described herein. The memory device 28B may include, but is not limited to, a hard disc drive, an optical disc drive, and/or a flash memory drive. Further, the memory device may be distributed and located at multiple locations.

In one embodiment of the present invention, the memory device 28B may include one or more of the memory devices and/or mass storage devices of one or more of the computing devices or servers. The modules/units that comprise the invention are composed of a combination of hardware and software, i.e., the hardware as modified by the applicable software applications. In one embodiment, the modules/units of the present invention are comprised of one or more of the components of one or more of the computing devices or servers, as modified by one or more software applications.

The communications unit 32 retrieves various data and information from the database 22 and sends information to the user computing device 12 via the communications network 14 to enable the user to access and interact with the system 10. In one embodiment, the communications unit 32 displays various images on a graphical interface of the user computing device 12 preferably by using computer graphics and image data stored in the database 22 including, but not limited to, web pages and/or any suitable information and/or images that enable the system 10 to function as described herein. The communications unit 32 may further send information about system 10 to the user, such as by e-mail, text message, or push notification.

The hosting unit 34 may be programmed to perform some or all of the functions of the hosting server 16 including hosting various web pages associated with one or more websites or web-based applications that are stored in the database 22 and that are accessible to the user via the user computing device 12. The hosting unit 34 may be programmed to generate and display web pages associated with a website in response to requests being received from users via corresponding web browsers.

In one embodiment of the present invention, the system configuration unit 36 may configure the system based on input from users via user computing device 12.

In one embodiment of the present invention, the image processing unit 38 may resize/scale and process images using OCR and store resultant data in database 22.

In one embodiment of the present invention, the validation unit 40 may compare user-submitted data, data processed by the image processing unit 38, and/or data stored in database 22 and validate data for accuracy.

Figure 3A:
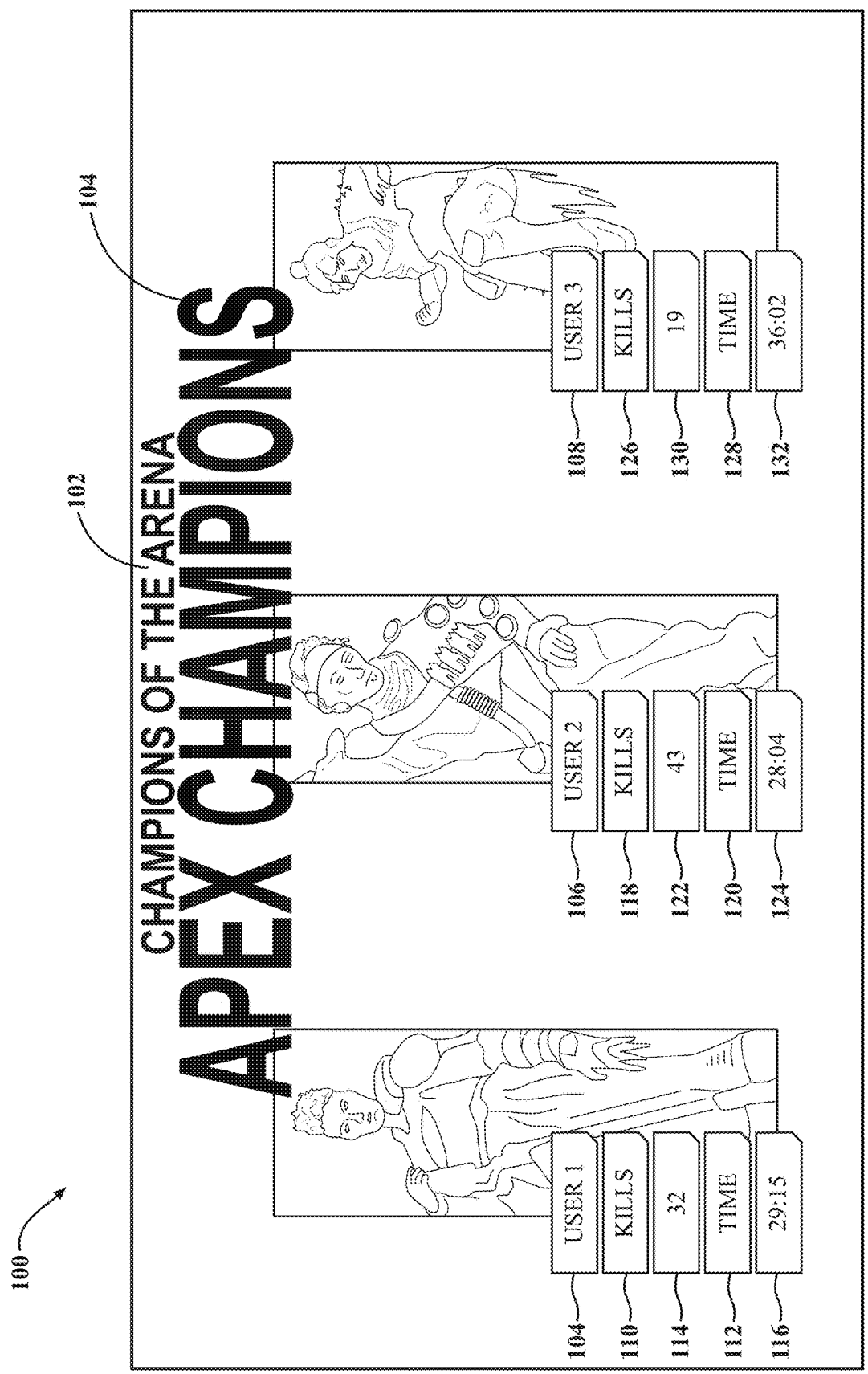
FIG. 3A is an exemplary screenshot of a game competition report, according to one embodiment of the present invention.

Referring now to FIG. 3A, an exemplary screenshot of a game competition report is illustrated. A screenshot 100 may include a variety of content and information, some of which may be relevant for game competition reporting and some of which may be irrelevant. For instance, in the illustrated example, a game title 102 may be relevant, because it may be used to verify to which game, perhaps of a plurality of games, the reporting screen correlates. However, there may be extraneous content, such as subtitle 104, which is not relevant because it does not directly correlate to information pertaining to the game. What content is relevant and irrelevant may be variable from game to game, or from user to user.

Additional relevant content may include, for example, a first username 106, a second username 108, and a third username 110, which may identify, for instance, the top players of the competition. It will be understood that more or fewer usernames (and their associated scoring data) may be included. Underneath each user, screenshot 100 may further include scoring data associated with each user. The scoring data may include a plurality of first user data titles 112 and 114. These may indicate certain scoring categories by title. For example, these may include the number of "kills" made in a game, the amount of time a player survived during a game, etc. These are purely illustrative categories only. It will be understood that each game may have varying titles for varying relevant scoring categories, which may be more or fewer than shown in the illustrated example. These data points, when combined, may be used by the game to determine a winner and/or a ranking of user's and therefore would be relevant to the game competition reporting and integrity verification process outlined herein.

Underneath each data scoring title, a specific score associated with each user may be shown. For example, underneath first username there are shown a plurality of first user data points 116 and 118. These may be displayed in numbers, letters, or alpha-numeric format, or any other suitable format for reporting a relevant scoring data point.

Each user listed on screenshot 100 may have its own set of scoring data. For example, underneath second username 108, there are shown a plurality of second user data titles 120 and 122, each followed by a plurality of second user data points 124 and 126. Similarly, underneath third username 110, there are shown a plurality of third user data titles 128 and 130, each followed by a plurality of second user data points 132 and 134.

Figure 3B:
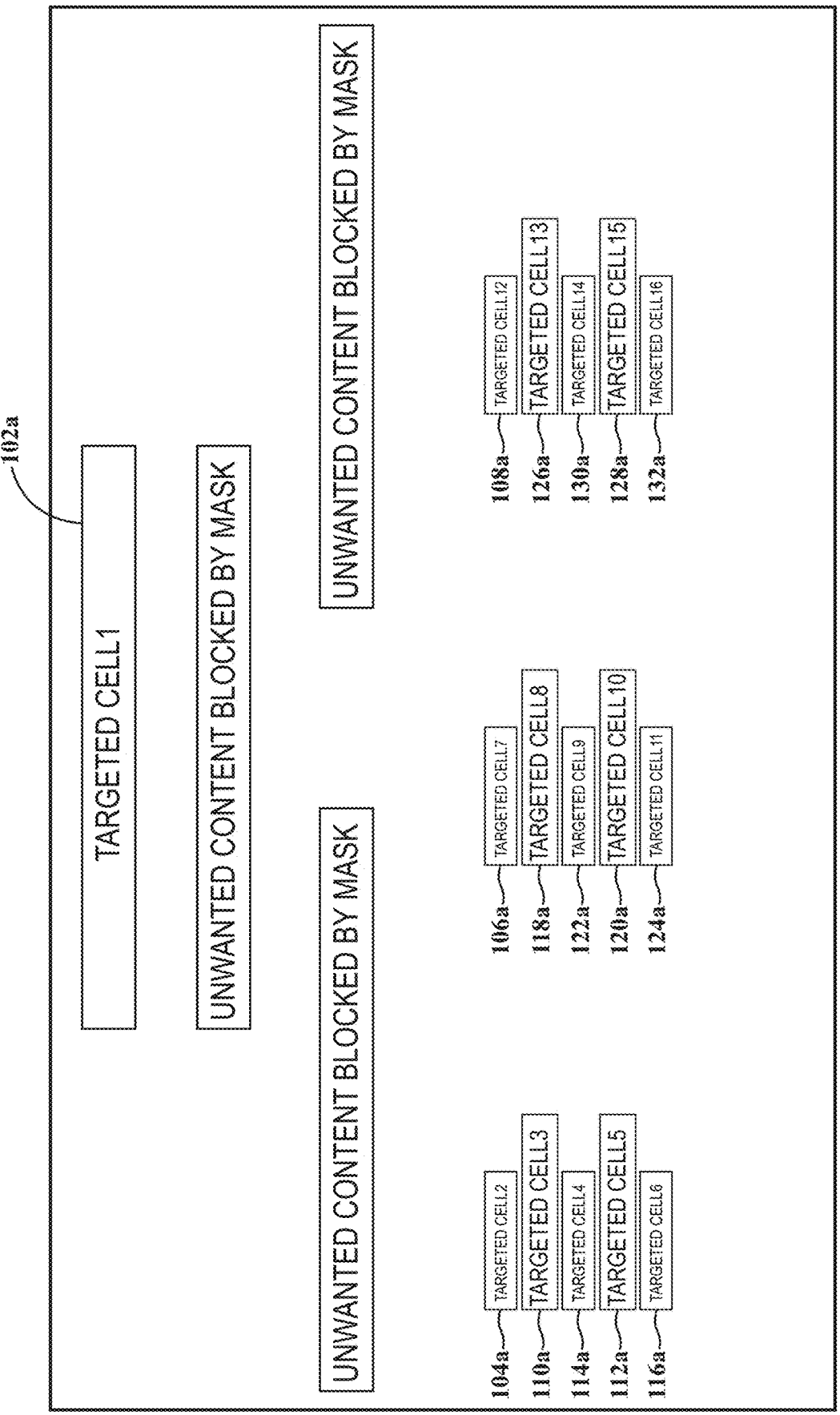
FIG. 3B is an exemplary mask of the screenshot of FIG. 3A, according to one embodiment of the present invention.

Referring now to FIG. 3B, an exemplary mask of the screenshot of FIG. 3A is illustrated. Once the relevant content is identified, a mask 200 is created for screenshot 100 to allow the system to capture the targeted relevant information and mask the irrelevant information. This is done to prevent the accidental capture/retrieval of irrelevant information by the system. In the areas that are not masked, the system will be able to produce an accurate reading of optical character recognition targeted data. In the illustrated example, the areas identified as "targeted cells" correspond to the relevant data fields identified in screenshot 100 of FIG. 3A. For example, target cell 102*a* corresponds to game title 102 and target cells 106*a*, 108*a*, and 110*a* correspond to usernames 106, 108, and 110. Similarly, the data fields underneath each user correspond to the identified data fields of screenshot 100. For example, cells 112*a* and 114*a* correspond to first user data titles 112, 114, and cells 116*a* and 118a correspond to first user data points 116, 118. Similarly, target cells 120a and 122a correspond to second user titles 120, 122, and cells 124a and 126a correspond to second user data points 124, 126. Similarly, target cells 128a and 130a correspond to third user titles 128, 130, and target cells 132a and 134a correspond to third user data points 132, 134.

Irrelevant data, which includes all data not specifically marked as a target cell, may be masked by the system. This may include images, texts, numbers, data, or any other content not deemed relevant to the system. The mask may be manipulated to fit any form of media on any device or platform.

Figure 3C:
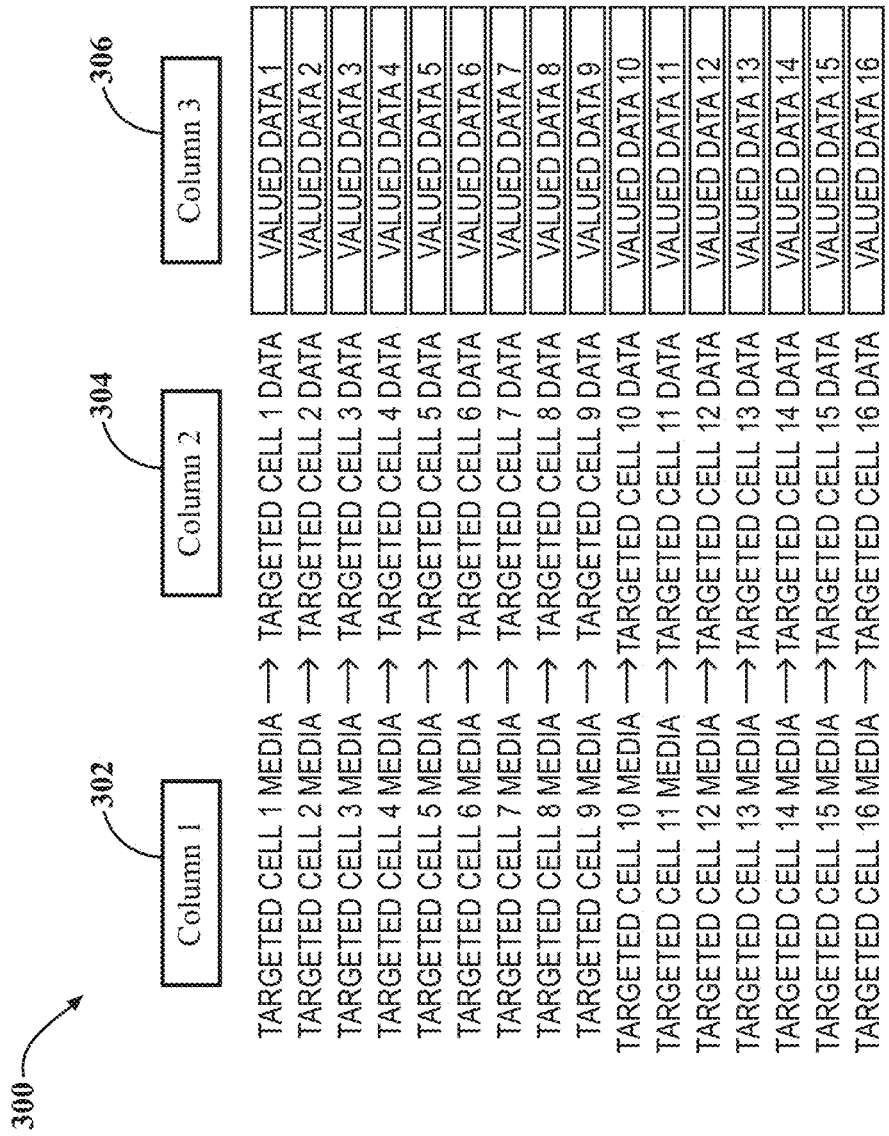
FIG. 3C is an exemplary data table corresponding to the screenshot of FIG. 3A and the mask of FIG. 3B, according to one embodiment of the present invention.

Referring now to FIG. 3C, an exemplary data table corresponding to the screenshot of FIG. 3A and the mask of FIG. 3B is illustrated. Media is extracted from the target cells of screenshot 100 after mask 200 is applied, and entered into database 300 into target data column 302. Optical character recognition is performed on the target data. The resultant data is entered into converted target data column 304. Valued target data is entered into column 306, which is then stored in database 22 and may be used by the system in any system algorithm for any purpose, e.g., reporting results, tracking results, tracking users' performance, etc.

Referring now to FIG. 4, a flow diagram illustrating an algorithm for a gaming report validation method according to one embodiment of the present invention is shown. The method may be used to improve reporting accuracy and validation of results without the need for game API attachment. To commence method 400, at step 402, a user media submission (such as a screenshot similar to screenshot 100 of FIG. 3A) is uploaded to server 24. Server 24 may be a custom server, or it may be an existing open media server. If server 24 is an existing open media server, at step 404, the user media submission is transferred to a custom server for pre-processing. At step 406, the media submission is pre-processed for resolution verification (see FIG. 7). The submission is compared with predefined media resolution criteria. If the submission matches the predefined media resolution criteria, no resizing is necessary. If the submission does not match the predefined media resolution criteria, at step 408, the submission will be resized (upscaled or downscaled) to match the predefined media resolution criteria. Once the submission's resolution matches the predefined media resolution criteria, at step 410, the submission is processed by applying a mask to the submission. The mask will have been generated using machine learning or may have been manually generated (see FIGS. 8-10). At step 412, the masked submission is subjected to an optical character recognition (OCR) process. The masked submission is scanned, OCR is applied to all unmasked areas, and unparsed/raw data is retrieved from those unmasked areas (see target data 302 of FIG. 3C). At step 414, the raw target data is mapped to the defined target cells of the mask. At step 416, the raw target data is marked as confirmed and may then be stored in database 22.

At step 418, the system matches the confirmed data with a user who submitted the data. At step 420, the data values are given key identifiers (such as data categories of FIG. 3A) and any additional game data needed to confirm the competition results. For instance, at this step, the confirmed data may be compared against data values manually entered by the user.

At step 422, the competition results are verified and the final data is submitted to database 22 for ranking, tracking, and/or sharing of results, user performance, or any other relevant metric. In some cases, it is possible that a user will disagree with the verified competition results and file a dispute. At optional step 424, if a dispute is filed, the submission and/or the raw target data will be manually compared against the verified data to determine whether there are any discrepancies in the verified competition results.

Referring now to FIG. 5, a flow diagram illustrating an algorithm for a gaming report validation method applied to an exemplary competitive video gaming environment according to one embodiment of the present invention is shown. To commence method 500, at step 502, game information is uploaded to server 24. Server 24 may be a custom server, or it may be an existing open media server. Game information includes at least a screenshot of a scoring report for a competition within a game and may also include information manually entered by a user. At step 504, the game information is saved to a custom or in-house server and marked as "unverified". At step 506, the game information, and more specifically a screenshot included with the game information, may be uploaded to cloud storage (by way of example and not limitation, cloud storage may be an Amazon® S3 Bucket) for initial preprocessing. At step 508, the image resolution of the screenshot is checked by is comparing it with predefined media resolution criteria. If the screenshot matches the predefined media resolution criteria, no resizing is necessary. If the screenshot does not match the predefined media resolution criteria, at step 510, the screenshot will be resized (upscaled or downscaled) to match the predefined media resolution criteria. Once the screenshot's resolution matches the predefined media resolution criteria, at step 512, the submission is processed by applying a mask to the screenshot. The mask will have been generated using machine learning or may have been manually generated (see FIGS. 8-10). At step 514, the masked screenshot is subjected to an optical character recognition (OCR) process. The masked screenshot is scanned, OCR is applied to all unmasked areas, and unparsed/raw data is retrieved from those unmasked areas (see target data 302 of FIG. 3C). At step 516, the raw target data is mapped to the defined target cells of the mask, which target cells correspond to screen coordinates of expected information based on the mask. At step 518, game information is retrieved from the in-house server, including scoring information about the competition at issue, and game information may be correlated with an existing user in the system (e.g., stored in user data 30B). A user's profile may be created or populated with game information using reported values. The raw target data is compared with the game information from the user profile at step 520. For example, at step 520, the scoring fields may be compared one by one to confirm a match; e.g., username; kills; deaths; times; etc. If any one of the raw target data values does not match the player model (e.g., the user-reported data varies from the game-reported data), the verification fails. If the raw target data values match the expected data from the player model, the game information is marked as "verified" at step 522. The final data is submitted to database 22 for ranking, tracking, and/or sharing of results, user performance, or any other relevant metric. In some cases, it is possible that a user will disagree with the verified competition results and file a dispute. At optional step 524, if the verification failed, an alert is sent to the user notifying the user that the verification failed and optionally providing the user an opportunity to file a dispute. At optional step 526, if a dispute is filed, the screenshot and/or the raw target data will be manually compared against the verified data to determine whether there are any discrepancies in the verified competition results.

Figure 6:
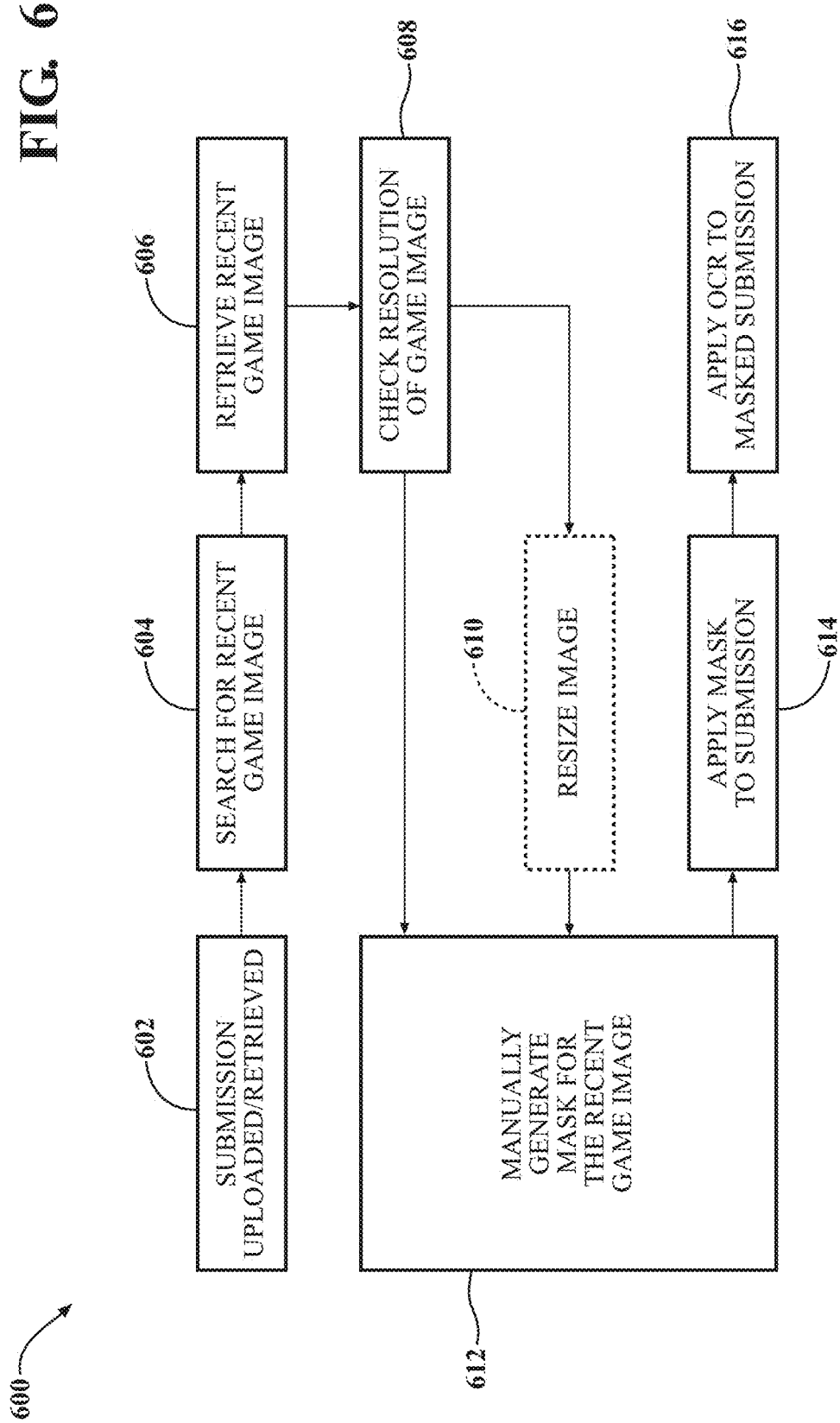
FIG. 6 is a flow diagram illustrating an algorithm for a submission matching method, according to one embodiment of the present invention.

Referring now to FIG. 6, a flow diagram illustrating an algorithm for a submission matching method according to one embodiment of the present invention is shown. In some instances, there may be different screenshots for different devices for the same game. For instance, a screenshot for a game may display differently on a laptop than on a tablet or a mobile device. In some embodiments, the user may provide enough information to the system to identify the screenshot (e.g., the user may provide information about the gaming platform and/or device and/or game). However, there may be instances where the system does not prompt the user to provide this information, or otherwise cannot parse the data provided by the user. Therefore, the system may need to independently identify a screenshot submitted by a user. This may be done, for instance, by matching it to a screenshot from a plurality of saved screenshots for a particular game.

To commence method 600, at step 602, a user media submission (such as a screenshot similar to screenshot 100 of FIG. 3A) related to a specific game is uploaded to server 24. Server 24 may be a custom server, or it may be an existing open media server. At step 604, an image processor searches the server for a recent image of the game. At step 606, a recent image of the game is retrieved and moved to image processing by processor (such as processor 28A). At step 608, the recent game image is analyzed by comparing it against predefined media resolution criteria. If the recent game image matches the predefined media resolution criteria, no resizing is necessary. If the recent game image does not match the predefined media resolution criteria, at step 610, the recent game image will be resized (upscaled or downscaled) to match the predefined media resolution criteria. Once the recent game image's resolution matches the predefined media resolution criteria, at step 612, a mask is manually generated for the recent game image. At step 614, the mask is applied to the user's submission. At step 616, the masked submission is subjected to an optical character recognition (OCR) process. The masked screenshot is scanned, OCR is applied to all unmasked areas, and unparsed/raw data is retrieved from those unmasked areas as alphanumeric or numeric values (see target data 302 of FIG. 3C).

Figure 7:
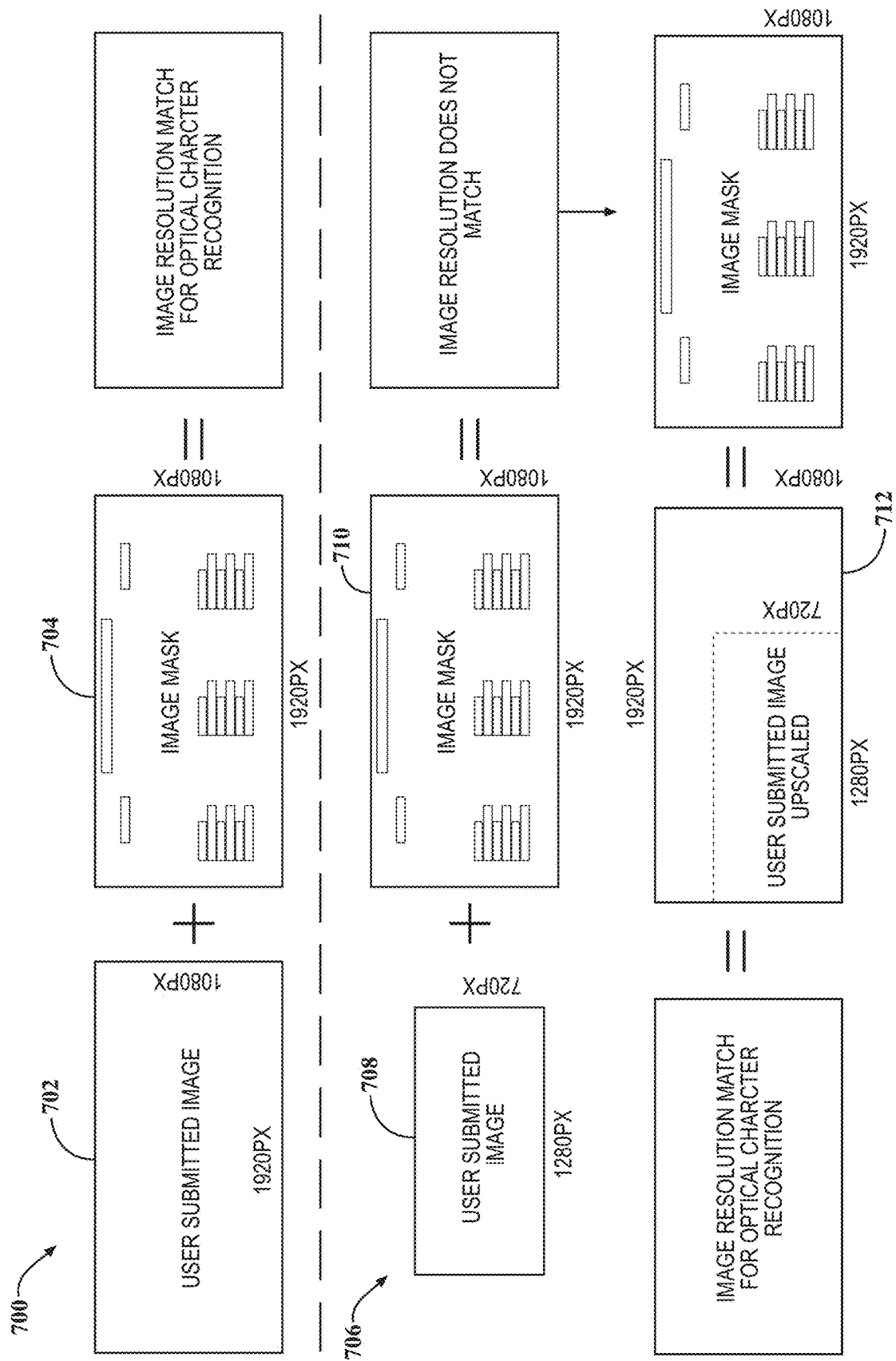
FIG. 7 is a flow diagram illustrating an image scaling method, according to one embodiment of the present invention.

Referring now to FIG. 7, a flow diagram illustrating an image scaling method according to one embodiment of the present invention is shown. In method 700, a user submission 702 measures 1920 pixels by 1080 pixels. A mask 704 also measures 1920 pixels by 1080 pixels. Therefore, when user submission 702 is compared against mask 704, there is a match and no resizing is required before masking and OCR processing. In method 706, a user submission 708 measures 1280 pixels by 720 pixels. A mask 710 measures 1920 pixels by 1080 pixels. Therefore, when user submission 708 is compared against mask 710, there is no match and resizing of user submission 708 is required. Resized user submission 712 measures 1920 pixels by 1080 pixels, which matches mask 710, and therefore it can proceed to masking and OCR processing.

The mask may be adjusted to any size, although standard images typically fall within the range of 1280 pixels by 720 pixels and 1920 pixels by 1018 pixels. It will be understood that any pixel resolution may be used for the mask, including by way of example but not limitation lower resolutions such as 584 pixels by 480 pixels and higher resolutions such as 3840 pixels by 2160 pixels or 4096 pixels by 2160 pixels. Although unlikely, in the event the resolution is not adequate for the system to reasonably detect and/or verify relevant information, the system may flag the submission with an error for further investigation by an operator. In some instances, the user may be required to resubmit an image that meets the minimum resolution requirements of the system.

Figure 8:
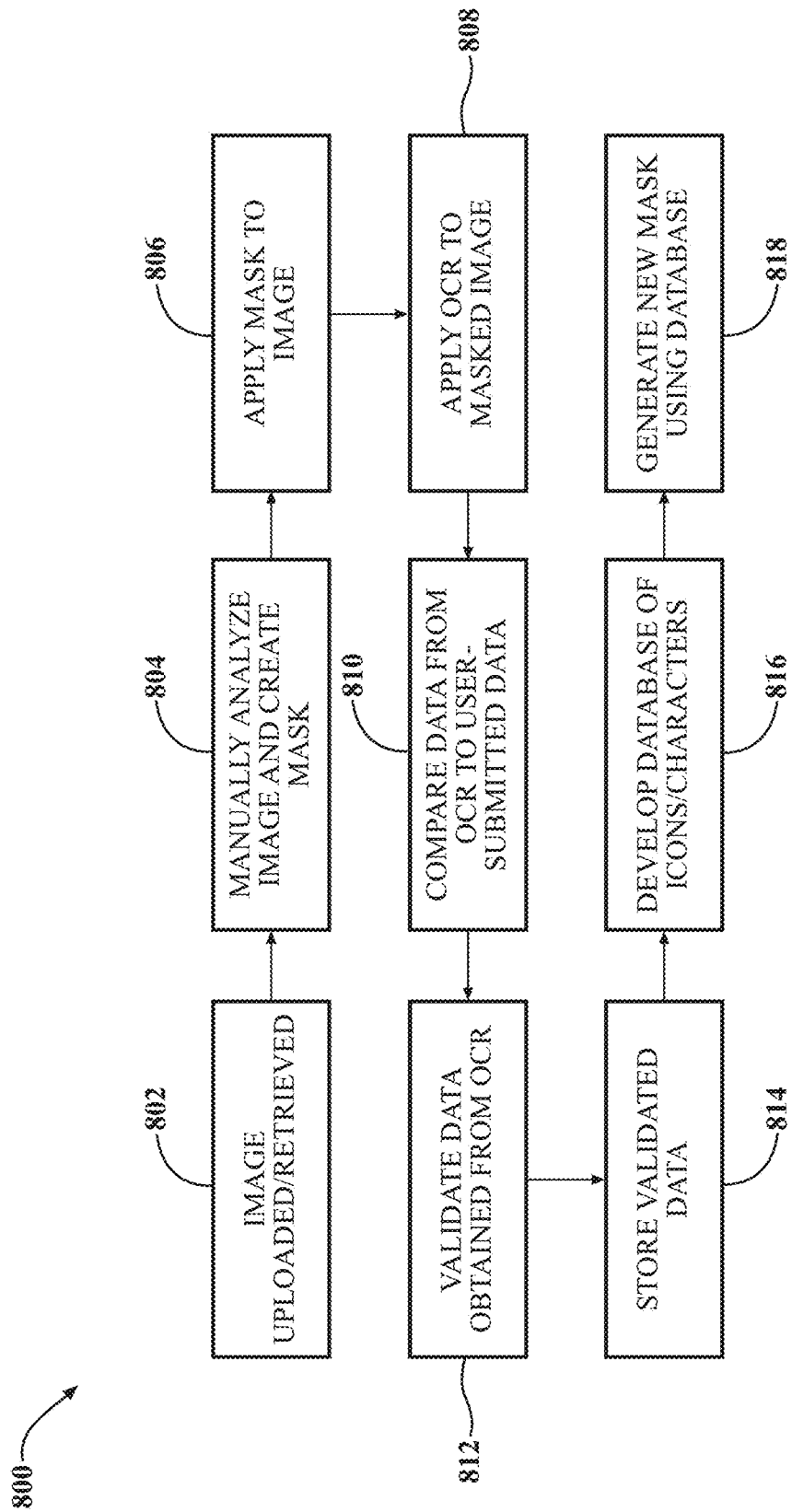
FIG. 8 is a flow diagram illustrating an algorithm for a manual mask creation method, according to one embodiment of the present invention.

Referring now to FIG. 8, a flow diagram illustrating an algorithm for a manual mask creation method according to one embodiment of the present invention is shown. After an image has been determined to meet predefined media resolution criteria (either because no scaling was necessary or after scaling/resizing process, see FIG. 7), a method 800 may commence by retrieving the image at step 802. At step 804, an operator manually analyzes the image and creates an image mask based on areas of interest. At step 806, the image mask is applied to the image. At step 808, OCR is performed on the masked image. At step 810, data values retrieved from the OCR process are compared against user-submitted data. At step 812, the data values are validated to confirm an accurate submission by the user. At step 814, the validated information is stored in database 22. Over time, machine learning is utilized to assess the validated information to create a library of desired icons and characters. At step 816, a database of desired icons and characters is developed. At step 818, a new mask for a new game (or an update of an existing game) may be generated using the database.

Figure 9:
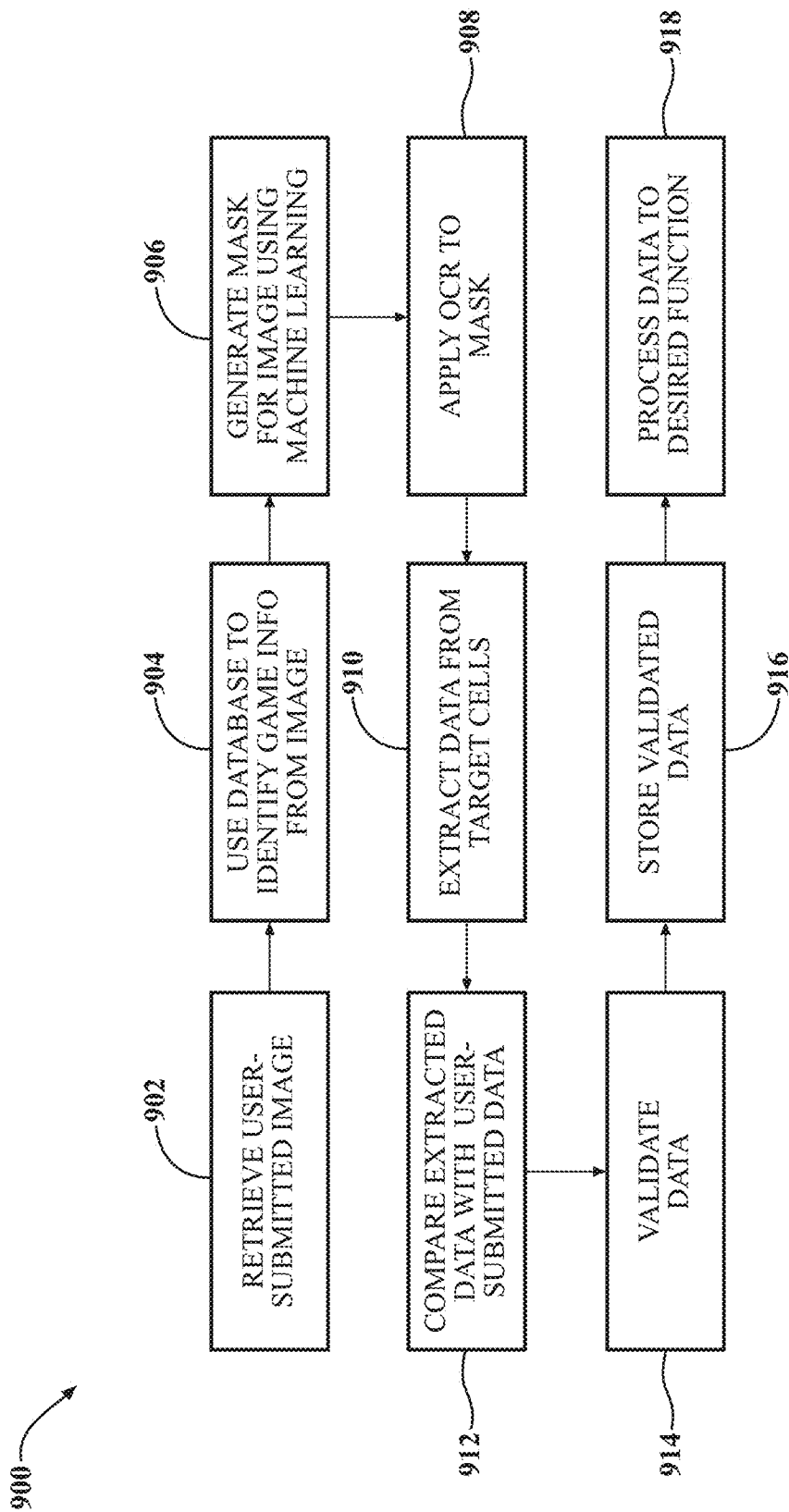
FIG. 9 is a flow diagram illustrating an algorithm for a machine learning mask creation method, according to one embodiment of the present invention.

Referring now to FIG. 9, a flow diagram illustrating an algorithm for a machine learning mask creation method according to one embodiment of the present invention is shown. After an image has been determined to meet predefined media resolution criteria (either because no scaling was necessary or after scaling/resizing process, see FIG. 7), a method 900 may commence by retrieving the image at step 902. At step 904, game details from the image are compared and matched from a database of logged icons and characters (see steps 814-816 of method 800 of FIG. 8) using OCR. At step 906, a mask is generated based on targeted icons and characters. At step 908, the image mask is applied to the image and OCR is performed on the masked image. At step 910, data values retrieved from the OCR process are converted to alphanumeric or numeric data. At step 912, the extracted data values are compared against user-submitted data. At step 914, the data values are validated to confirm an accurate submission by the user. At step 916, the validated information is stored in database 22. Over time, machine learning is utilized to assess the validated information to continue to build the database of desired icons and characters. At step 918, the data is processed to desired function, including but not limited to tournament results, statistics, and other in-game details for use.

Figure 10:
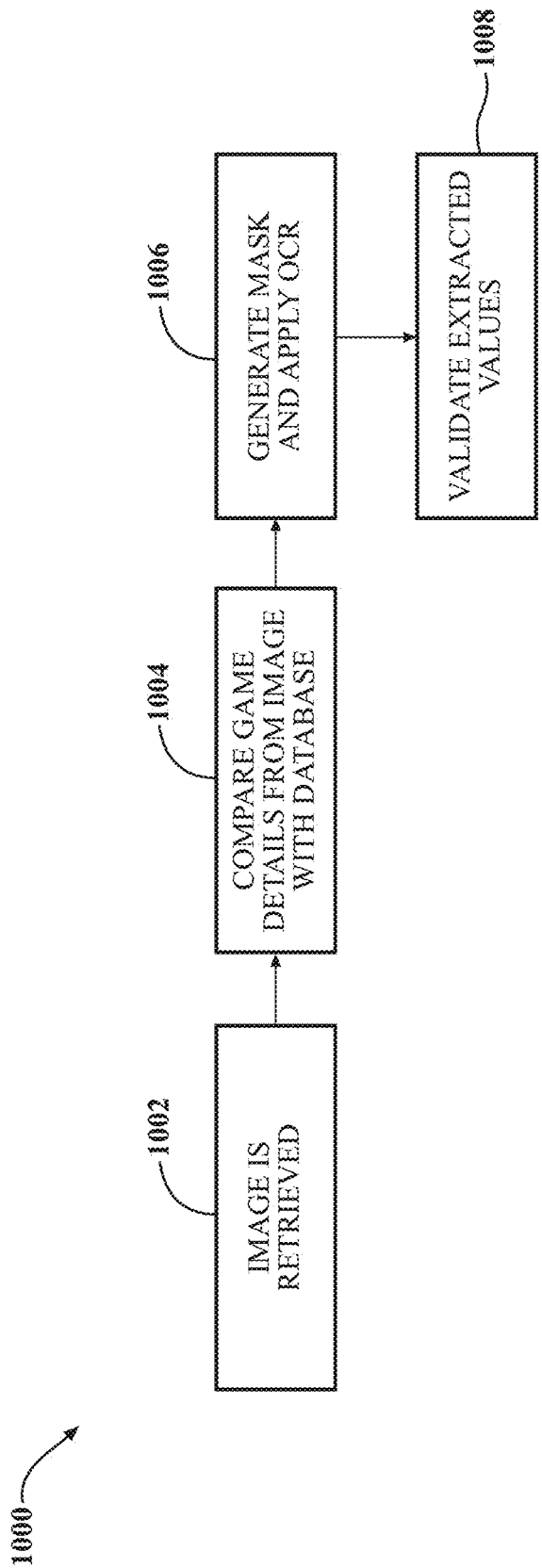
FIG. 10 is a flow diagram illustrating an algorithm for a fully automated machine learning mask creation method, according to one embodiment of the present invention.

Referring now to FIG. 10, a flow diagram illustrating an algorithm for a fully automated machine learning mask creation method according to one embodiment of the present invention is shown. After an image has been determined to meet predefined media resolution criteria (either because no scaling was necessary or after scaling/resizing process, see FIG. 7), a method 1000 may commence by retrieving the image at step 1002. At step 1004, game details from the image are compared and matched from a database of logged icons and characters (see steps 814-816 of method 800 of FIG. 8) using OCR. At step 1006, a mask is generated based on targeted icons and characters, and OCR is performed on the masked image. At step 1008, the extracted data values are validated without comparing them to user-submitted data. The information validated by this process may be used to advance online video game competitions/esports and track online video game competitors/esports players; statistics for database storage and public access.

Figure 11:
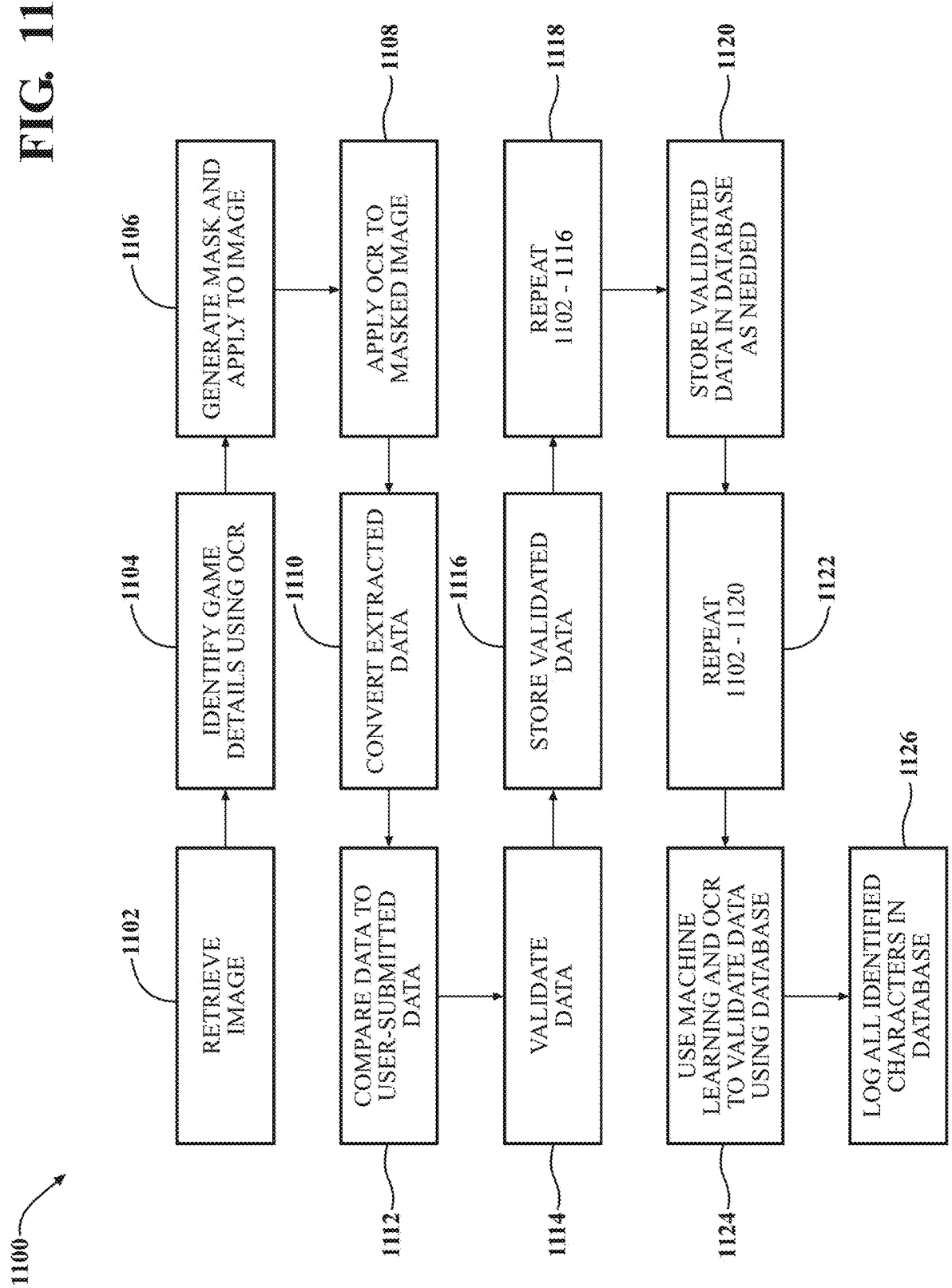
FIG. 11 is a flow diagram illustrating an algorithm for a database creation method utilized in automated machine learning mask creation, according to one embodiment of the present invention.

Referring now to FIG. 11, a flow diagram illustrating an algorithm for a database creation method utilized in automated machine learning mask creation according to one embodiment of the present invention is shown. After an image has been determined to meet predefined media resolution criteria (either because no scaling was necessary or after scaling/resizing process, see FIG. 7), a method 1100 may commence by retrieving the image at step 1102. At step 1104, game details from the image are compared and matched from a database of logged icons and characters (see steps 814-816 of method 800 of FIG. 8) using OCR. At step 1106, a mask is generated based on targeted icons and characters, and at step 1108, OCR is performed on the masked image. At step 1110, data values retrieved from the OCR process are converted to alphanumeric or numeric data. At step 1112, the extracted data values are compared against user-submitted data. At step 1114, the data values are validated to confirm an accurate submission by the user. At step 1116, the validated information is stored in database 22. Over time, machine learning is utilized to assess the validated information to continue to build the database of desired icons and characters. At step 1118, the process (steps 1102-1116) are repeated to formulate a database of confirmed icons and alphanumeric values to begin identifying characters from any user-submitted image. If at any point during the process, OCR identifies values that match 100% with any icons or characters in the machine learning database, those values are stored at step 1120 in the database for future OCR needs. At step 1122, the entire process (steps 1102-1120) may be repeated until mask creation can be automated without any manual input from an operator. At step 1124, the OCR process utilizes machine learning to validate icons and characters using only the user-submitted image. At step 1126, all identified characters are logged into the database for compounding and scaling the automated machine learning application. It will be understood that although the method of 1100 requires some manual functions to be performed by an operator, once the database has cross-checked enough values and validated them, the process will become automated over time and eliminate the need for an operator to manually input or check any information, except as may be desired from time to time for quality control purposes.

Figure 12:
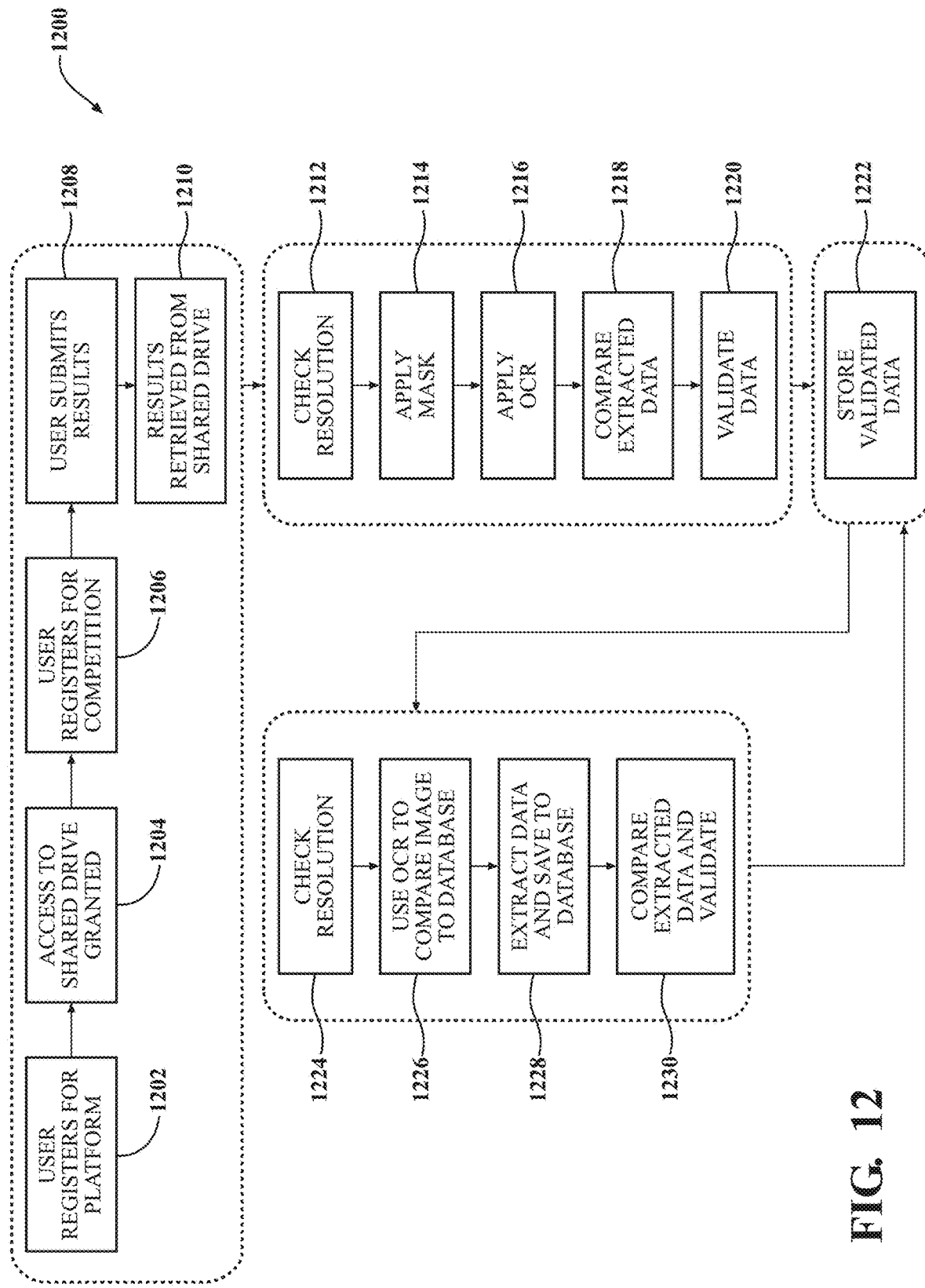
FIG. 12 is a flow diagram illustrating an algorithm for a detailed mask creation method using both manual and machine learning functions, according to one embodiment of the present invention.

Referring now to FIG. 12, a flow diagram illustrating an algorithm for a detailed mask creation method using both manual and machine learning functions according to one embodiment of the present invention is shown. A method 1200 begins with step 1202, with a user registering an account on a private platform and linking a shared cloud drive to the user's registered account. At step 1204, the user grants the private platform access to the shared cloud drive. At step 1206, the user registers for a gaming competition. At step 1208, the user submits results of the gaming competition by entering text (in alphanumeric form) on a reporting screen and uploads a media submission (e.g., a screenshot) to the shared media drive. At step 1210, the system retrieves the text and media submissions from the shared media drive. At step 1212, the media submission is compared with predefined media resolution criteria. If the submission matches the predefined media resolution criteria, no resizing is necessary. If the submission does not match the predefined media resolution criteria, the submission will be resized (upscaled or downscaled) to match the predefined media resolution criteria. Once the submission's resolution matches the predefined media resolution criteria, at step 1214, the submission is processed by applying a mask to the submission. At step 1216, the masked submission is subjected to an optical character recognition (OCR) process. The masked submission is scanned, OCR is applied to all unmasked areas, and unparsed/raw data is retrieved from those unmasked areas (see target data 302 of FIG. 3C). Data values retrieved from the OCR process are converted to alphanumeric or numeric data.

At step 1218, the extracted data values are compared against the user-submitted text data. At step 1220, the data values are validated to confirm an accurate submission by the user. At step 1222, the validated information is stored in database 22. Over time, machine learning is utilized to assess the validated information to continue to build the database of desired icons and characters.

Steps 1202 to 1210 may be repeated. Instead of proceeding to step 1212, at step 1224, the media submission is compared with predefined media resolution criteria. If the submission matches the predefined media resolution criteria, no resizing is necessary. If the submission does not match the predefined media resolution criteria, the submission will be resized (upscaled or downscaled) to match the predefined media resolution criteria. Once the submission's resolution matches the predefined media resolution criteria, at step 1226, game details from the submission are compared and matched from the database of logged icons and characters using OCR. At step 1228, image pixels are identified as icons or characters and extracted from the submission to be placed in the database. At step 1230, the extracted data values are compared against user-submitted data and are validated to confirm an accurate submission by the user. The validated information is stored in database 22. Over time, machine learning is utilized to assess the validated information to continue to build the database of desired icons and characters.

Although the illustrative flowcharts primarily reference user-submitted images (such as screenshots), those skilled in the art will recognize and understand that any suitable media submission may function the same way as a still image in the processes of the present system. For instance, a frame or frames from a video/broadcast/stream may be used instead of a screenshot. In another embodiment, the system may have access to a live game on a gaming platform (e.g., a URL where a live stream of gaming competition is occurring). The system may capture one or more frames of the live stream at predetermined points during the stream and/or in response to certain event(s) or trigger(s) during the game. For instance and not by way of limitation, time-stamping could be used to identify and pull relevant segments of a recording or a real-time broadcast to capture the same information that would be included within a screenshot. The frame(s) could then be converted to still image(s) similar to a screenshot, and the processes of masking and OCR would be applied to the image(s) as described in detail herein.

Although OCR technology generally produces accurate results, some characters may be so similar that they are difficult to distinguish from one another. As an example, in some media, it may be difficult to distinguish the number zero ("0") from the letter "O". Accordingly, in some embodiments, there may be some additional, optional methods incorporated into the systems and methods outlined herein and in the figures, to assist with identification of such characters. By way of example and not limitation, a method may be employed whereby a different character, which is easily recognizable, such as a number "7" may be added prior to any zero. Thus, all zero characters will be read as numbers because they will be read as "70". After OCR is complete, the additional characters (in this example, the additional number "7") will be removed, leaving only the accurately read number "0" characters and letter "O" characters.

The system described herein relies users submitting accurate, unmanipulated screenshots of results. Attempts may be made to manipulate data and/or screenshots to gain an advantage in a competition or tournament. Accordingly, the system may include any number of safeguards to prevent or detect manipulation of data. For instance, and not by way of limitation, the system may use metadata, such as timestamps, to flag potentially problematic submissions. For example, the system may require a timestamp to verify when a screenshot was saved, and compare it to a timestamp indicating when a game or competition ended. The amount of time between the two timestamps may indicate that a user had enough time to manipulate a screenshot or data, or that the saved a screenshot mid-game rather than after the end of a game, etc. In this instance, the system may flag the submission as potentially inaccurate and further investigation and/or evidence may be required to verify results.

The system of the present invention streamlines the user submission process and validation of results, which allows for a higher level of player participation, in terms of both quantity of players and time of play. Another benefit of the system of the present invention is that it can be connected to both custom-built and/or pre-existing media aggregation servers, such as XBOX®, Microsoft One Drive®, or any other shared servers accessible via open source or API and attached to gaming platforms. The algorithmic process for generating validated data includes a reporting system for submission of media or access to media servers specific to the user, custom in-house servers for storage of media, resolution modulation to upscale or downscale media for consistency of process in future phases, facilitation of media through a custom-built, targeted, masking process to remove unnecessary areas of the media, OCR scanning to return unparsed data, media data retrieval for valued data, and database organization of retrieved data for reporting, storage and display. The system also allows user to access processed/validated data for review, tracking, and/or sharing purposes. Another advantage of the system is that it identifies and incorporates updates and modifications to games and competitions, which is important given that gaming involves continuously developing technologies.

The systems and methods of the disclosure may also be used in a variety of contexts outside of purely a gaming competition environment. For example, and not by way of limitation, educational institutions may utilize e-sports gameplay for educational purposes on an educational computing platform, in which these systems and methods may also be integrated or used. The systems and methods may be used in the detailed tracking of statistics, such as on a statistics tracking computing platform, similar to tracking of traditional sports statistics. Tracked statistics may include, for example, aggregating a total number of kills, deaths, assists, captures, etc. Statistics and results may additionally be extracted using these systems and methods for use in an e-sports betting/wagering computing platform (paid or free). It will be evident that the systems and methods described herein, along with the data derived from the same, may be useful in a variety of industries and different types of computing platforms. Moreover, the functionality may be performed by the disclosed system, or the extracted data may instead be sent to an external computing platform.

Although specific features of various embodiments of the disclosure may be shown in some drawings and not in others, this is for convenience only. In accordance with the principles of the disclosure, any feature of a drawing or other embodiment may be referenced and/or claimed in combination with any feature of any other drawing or embodiment.

This written description uses examples to describe embodiments of the disclosure and also to enable any person skilled in the art to practice the embodiments, including making and using any articles or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a database stored on a server;
a processing device of the server, wherein the processing device is in communication with a user device accessible to a user, the processing device including:
a hosting unit configured to generate and display a web-based application on a user device,
a communications unit configured to enable the user to access and interact with the web-based application on the user device and receive at least one user-submitted image and a plurality of user-submitted data from the user,
an image processing unit configured to process the at least one user-submitted image to retrieve game data, and
a validation unit configured to compare the plurality of user-submitted data with the game data and validate the game data, wherein the image processing unit is further configured to select and apply an image mask to the at least one user-submitted image.

2. The system of claim 1, wherein the image processing unit is further configured to resize the at least one user-submitted image based on predefined media resolution criteria.

3. A The system comprising:
a database stored on a server;
a processing device of the server, wherein the processing device is in communication with a user device accessible to a user, the processing device including:
a hosting unit configured to generate and display a web-based application on a user device,
a communications unit configured to enable the user to access and interact with the web-based application on the user device and receive at least one user-submitted image and a plurality of user-submitted data from the user,
an image processing unit configured to process the at least one user-submitted image to retrieve game data, and
a validation unit configured to compare the plurality of user-submitted data with the game data and validate the game data, wherein the image processing unit is further configured to select and apply an image mask to the at least one user-submitted image, wherein after the image mask is applied to the at least one user-submitted image, a plurality of predefined relevant data fields are detectable, wherein each of the plurality of predefined relevant data fields corresponds to a target cell of the image mask.

4. The system of claim 3, wherein the image processing unit is further configured to apply optical character recognition to the plurality of predefined relevant data fields.

5. The system of claim 4, wherein the image processing unit is further configured to retrieve game data based on the optical character recognition of the plurality of predefined relevant data fields.

6. The system of claim 5, wherein the image processing unit is further configured to map the game data to the plurality of target cells of the image mask.

7. The system of claim 6, wherein the validation unit is further configured to submit the validated game data to the database for storage.

8. A computer-implemented method comprising:
generating and displaying, by a hosting unit, a web-based application on a user device accessible by a user;
enabling, by a communication unit, the user to access and interact with the web-based application on the user device;
receiving, by the communication unit, at least one user-submitted image and a plurality of user-submitted data from the user;
processing, by an image processing unit, the at least one user-submitted image to retrieve game data;
comparing, by a validation unit, the plurality of user-submitted data with the game data;
validating, by the validation unit, the game data; and
selecting, by the image processing unit, an image mask from a plurality of image masks.

9. The computer-implemented method of claim 8, further comprising the step of resizing, by the image processing unit, the at least one user-submitted image based on predefined media resolution criteria.

10. The computer-implemented method of claim 8 further comprising the step of applying, by the image processing unit, the image mask to the at least one user-submitted image, wherein after the image mask is applied to the at least one user-submitted image, a plurality of predefined relevant data fields are detectable, and wherein each of the plurality of predefined relevant data fields corresponds to a target cell of the image mask.

11. The computer-implemented method of claim 10, further comprising the steps of:
applying, by the image processing unit, optical character recognition to the plurality of predefined relevant data fields, and
retrieving, by the image processing unit, game data based on the optical character recognition of the plurality of predefined relevant data fields.

12. The computer-implemented method of claim 11, further comprising the step of mapping, by the image processing unit, the game data to the plurality of target cells of the image mask.

13. The computer-implemented method of claim 12, further comprising the step of submitting, by the validation unit, the validated game data to the database for storage.

14. A non-transitory information recording medium on which a computer readable program is recorded that causes a computer to function as a system comprising:
a database stored on a server;
a processing device of the server, wherein the processing device is in communication with a user device accessible to a user, the processing device including:
a hosting unit configured to generate and display a web-based application on a user device,
a communications unit configured to enable the user to access and interact with the web-based application on the user device and receive at least one user-submitted image and a plurality of user-submitted data from the user,
an image processing unit configured to process the at least one user-submitted image to retrieve game data, and
a validation unit configured to compare the plurality of user-submitted data with the game data and validate the game data, wherein the image processing unit is further configured to:
resize the at least one user-submitted image based on predefined media resolution criteria,
select and apply an image mask to the at least one user-submitted image, wherein after the image mask is applied to the at least one user-submitted image, a plurality of predefined relevant data fields are detectable, wherein each of the plurality of predefined relevant data fields corresponds to a target cell of the image mask;
apply optical character recognition to the plurality of predefined relevant data fields,
retrieve game data based on the optical character recognition of the plurality of predefined relevant data fields, and
map the game data to the plurality of target cells of the image mask; and
the validation unit is further configured to submit the validated game data to the database for storage.

15. The system of claim 1, wherein the game data is utilized within an educational computing platform.

16. The system of claim 1, wherein the game data is utilized within a statistical tracking computing platform.

17. The system of claim 1, wherein the game data is utilized within an e-sports betting computing platform.

* * * * *